United States Patent [19]

McIlrath

[11] 3,945,749

[45] Mar. 23, 1976

[54] CLAMPING APPARATUS FOR SUPPORTING A MACHINING DEVICE

[75] Inventor: William P. McIlrath, Racine, Wis.

[73] Assignee: Racine Railroad Products, Inc., Racine, Wis.

[22] Filed: Apr. 24, 1975

[21] Appl. No.: 571,473

[52] U.S. Cl. .............. 408/95; 51/241 LG; 90/12 A; 408/103

[51] Int. Cl.² ..................... B23B 45/08; B23B 45/14

[58] Field of Search ......... 408/78, 95, 99, 101, 103, 408/108, 109, 110; 51/178, 241 S, 241 LG; 90/12 A

[56] References Cited

UNITED STATES PATENTS

| | | | |
|---|---|---|---|
| 1,178,567 | 4/1916 | Wuerpel | 408/78 |
| 2,887,908 | 5/1959 | Miller | 408/78 |
| 3,273,424 | 9/1966 | Hughes | 408/95 |
| 3,706,505 | 12/1972 | Stougaard | 408/95 X |

*Primary Examiner*—Robert L. Spruill

*Attorney, Agent, or Firm*—Wegner, Stellman, McCord, Wiles & Wood

[57] ABSTRACT

A clamping apparatus attachable to a rail for supporting a portable machine tool therefrom including exchangeable and formed clamping blocks with pre-set adjustment members to match points on the web contour between the base and head of all sizes of rail, and to accurately align and securely lock the machine tool into its proper working position relative to the rail without any location against parts of the rail subject to wear.

7 Claims, 3 Drawing Figures

Fig. 1.
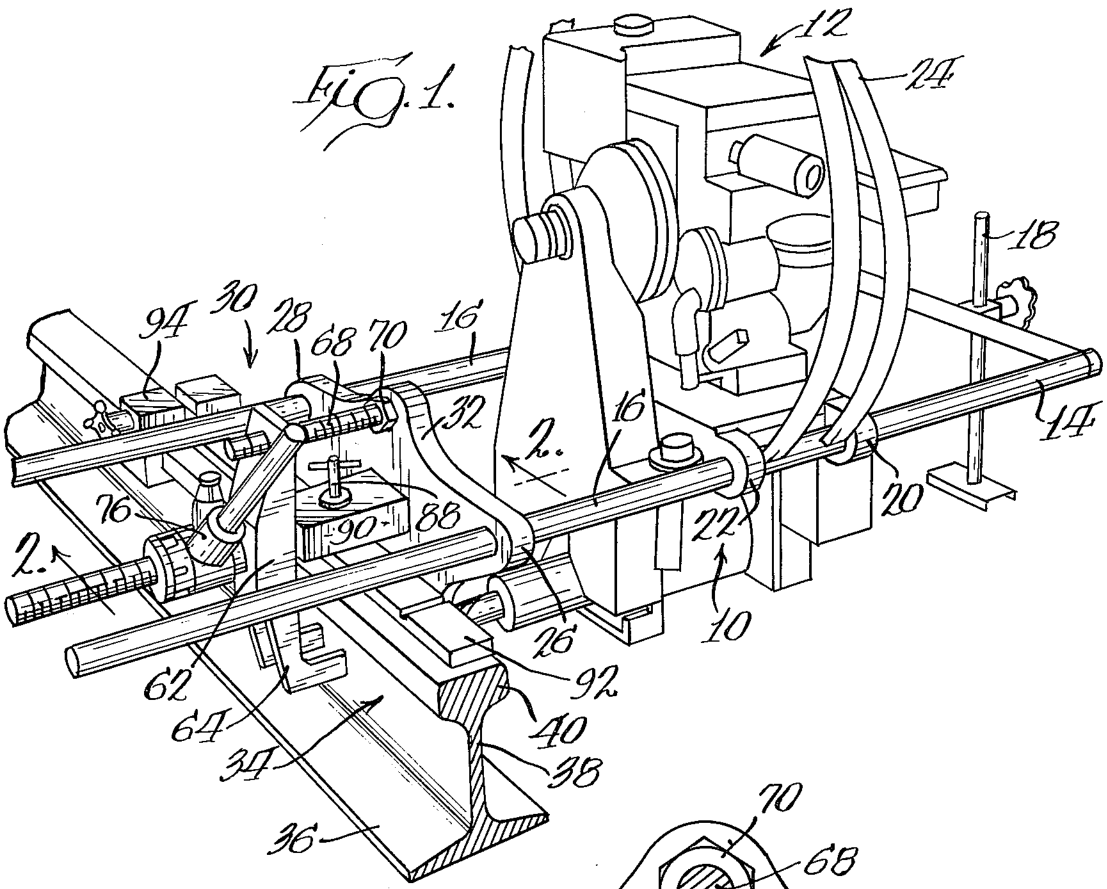
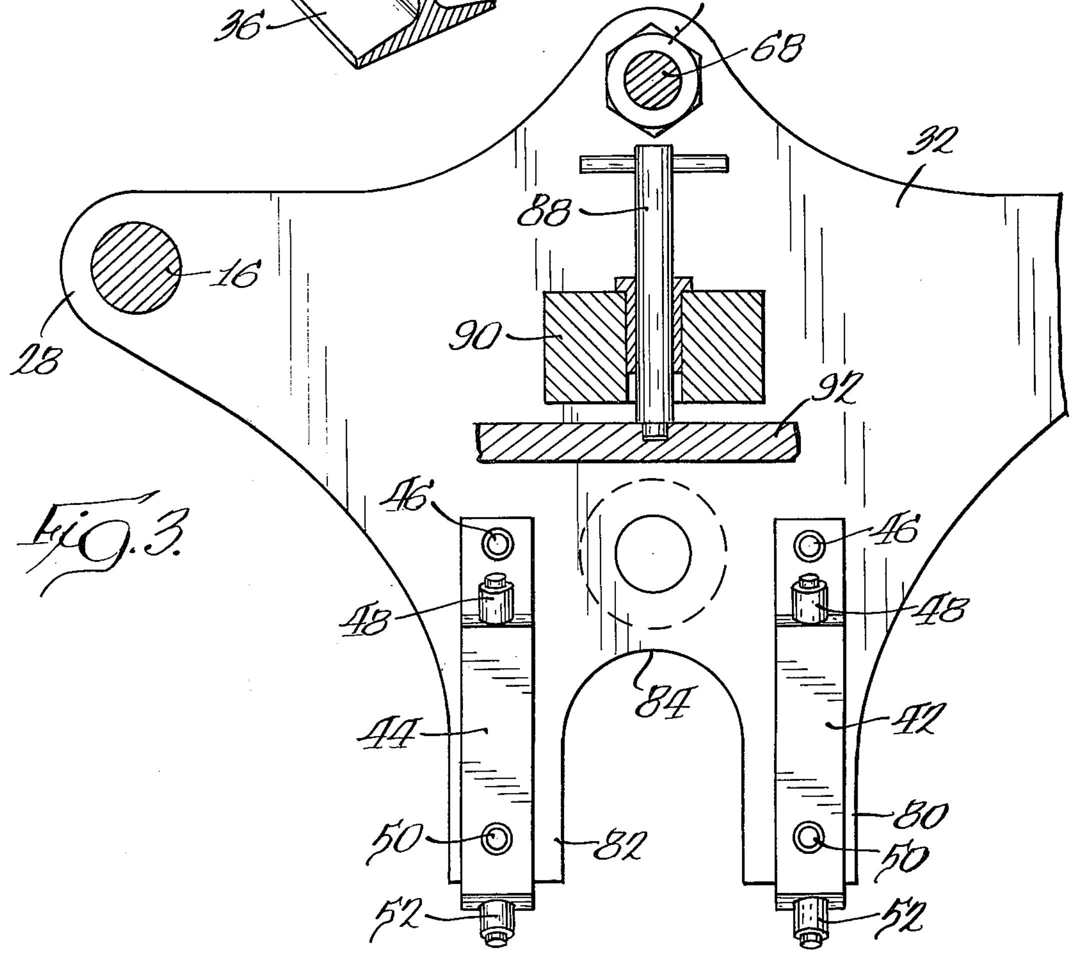
Fig. 3.

CLAMPING APPARATUS FOR SUPPORTING A MACHINING DEVICE

BACKGROUND OF THE INVENTION

This invention relates to a clamping apparatus for supporting a portable machine tool, which can be used in railroad track work and, more specifically, to support a portable rail drill which is used for the drilling of a plurality of holes adjacent the rail joint preparatory to attachment of plate to sections of rail abutting at the joints.

A clamping apparatus of the general type disclosed herein is shown in Miller U.S. Pat. No. 2,887,908 and Stougaard U.S. Pat. No. 3,706,505, owned by the assignee of this application. Miller shows a rail drill of a size and weight to be portable which is provided with a frame having legs for ground support and a clamping device for clamping it to a rail. The rail drill shown in the patent has an impositive clamping device which did not securely hold the unit to the rail during drilling of a hole.

Stougaard discloses an improved clamping structure that provides the secure gripping of a rail to hold the rail drill firmly locked in position during drilling. Means are shown for simply adjusting the rail drill unit to four different pre-set height adjustments to handle a plurality of different sized rails which provide for repeated accuracy in the height adjustment of the rail drill. Accurate alignment of the rail drill is not assured because of the clamp unit locating beam on the top of the rail ball, which is subject to wear.

SUMMARY OF THE INVENTION

It is a primary object of the present invention to provide a clamping apparatus attachable to a rail for supporting a portable machine tool in an accurate working position relative to the rail which is unaffected by rail wear.

A still further object of the present invention is to provide a clamping apparatus for supporting a portable rail tool which holds the rail tool on a rail including exchangeable block members selectable to match the web contour between the base and head of a particular rail size on one side thereof and a clamping element engageable with the web of the rail on the side opposite from the one side, and means for drawing the block members and element toward each other whereby the block members become wedged in the web contour on the one side of the rail and also coact with the clamping element to securely hold the rail tool in place.

Another object of the present invention is to provide a clamping apparatus for a portable rail drill which includes a plurality of exchangeable clamping blocks, each pair having a different dimension to match the web contour on at least one side of the rail between the base and head of a particular rail size so that the clamping apparatus securely locks the rail drill into a proper position for drilling holes having accurate vertical hole center distance on the web between the base and head of the rail.

One feature of the invention is the provision of pre-set adjustable screws for a clamping block which provide good four-point contact with the non-wear contour of the rail web whereby a clamping block may be easily pre-set in the factory for a particular size rail.

BRIEF DESCRIPTION OF THE DRAWINGS

FIG. 1 is a perspective view of a clamping apparatus supporting a portable rail drill in operative position in association with a rail section;

FIG. 3 is a fragmentary vertical section taken generally along the line 3—3 in FIG. 2.

DESCRIPTION OF THE PREFERRED EMBODIMENT

Figure 2:
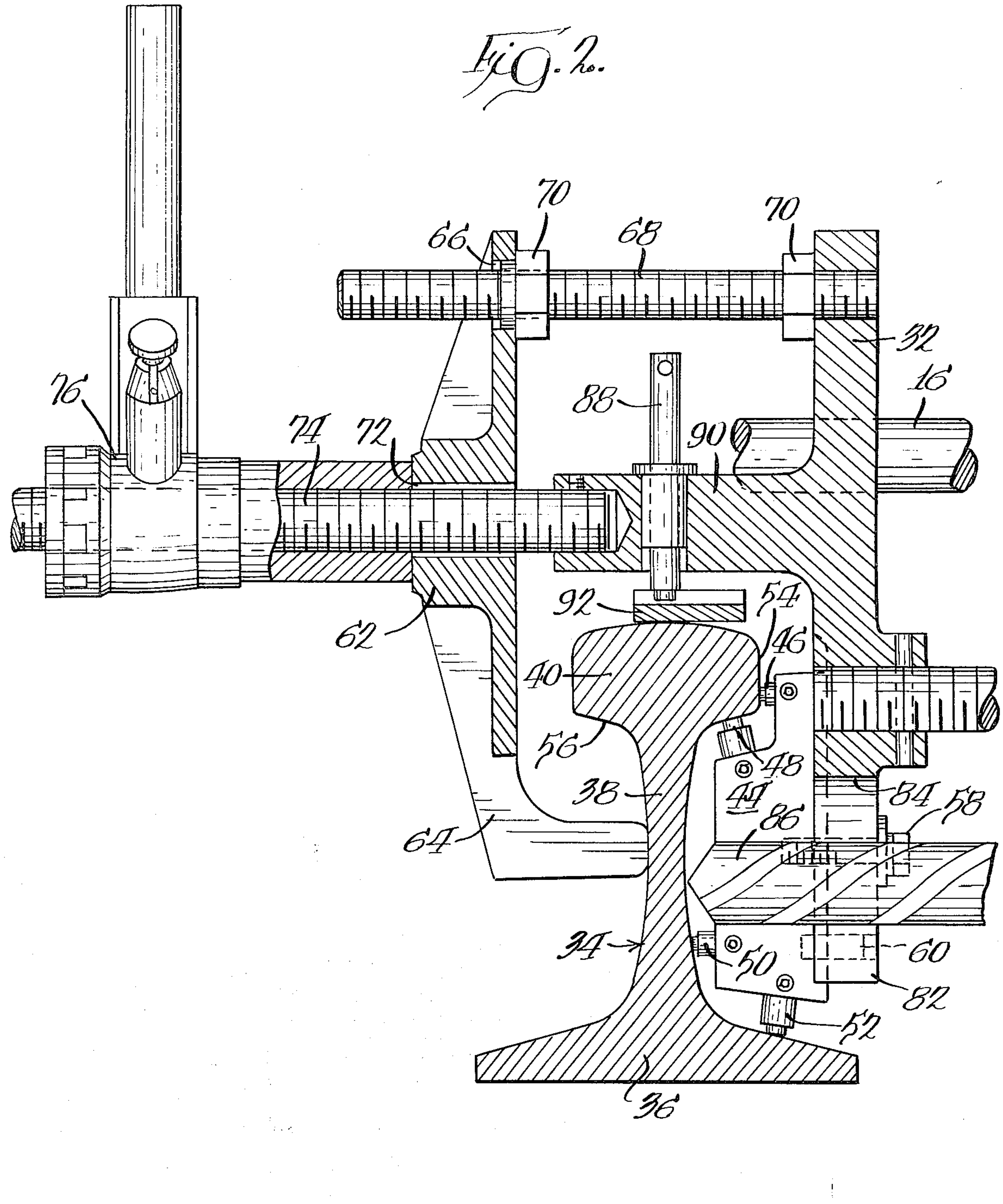
FIG. 2 is a vertical section thereof on an enlarged scale, taken along the line 2—2 in FIG. 1.

The clamping apparatus for supporting a portable machine tool such as a rail drill on a rail is shown generally in FIG. 1, wherein the drill casing, indicated generally at 10, mounts a gas engine, indicated generally at 12, to provide power. A supporting structure includes a pair of rods 14 and 16 which mount a ground-engaging adjustable leg 18, and each of the rods 14 and 16 extends through a pair of openings formed in ears of the drill casing, two of which are shown at 20 and 22. A protective roll bar 24 encircles the gasoline engine and attaches to rods 14 and 16 between the ears formed on the drill casing. Each of the rods 14 and 16 extends beyond the casing 10 and passes through a pair of openings formed in ears 26 and 28 of a clamp structure, indicated generally at 30. This general arrangement of structure is the same as that shown in U.S. Pat. No. 3,706,505 previously referred to, and reference may be made thereto for a more complete description of the general frame structure.

The clamp structure 30 includes a base plate 32 having the ears 26 and 28, as shown in FIG. 1, and is of a sufficient height to extend both above and below the head of a rail, generally indicated at 34. The rail 34 has a base 36 with a web 38 extending upwardly therefrom to the head 40.

The clamp structure 30 further includes a pair of spaced-apart clamping blocks 42 and 44 of the same construction. Each clamping block has four adjustable screws protruding from the block and which are factory pre-set by recessed Allen screws on the blocks for a good four-point contact on the non-wear surfaces of the rail 34. The adjustable screws 46, 48, 50 and 52 engage one side of the rail on the vertical portion of the head 54 beneath the head 56 against the web 38 and on top of the base 36, respectively, as shown in FIG. 2. The clamping blocks 42 and 44 are each secured to the base plate 32 by a cap screw 58 and a dowel pin 60 for a quick change since a separate set of clamp members of different dimensions is required for each rail size. The clamping blocks 42 and 44 provide four points of contact at two different locations spaced along the length of the rail and coact with a clamp bar 62 on the other side of the rail to securely clamp the structure 30 to the rail. The clamp bar 62 extends vertically at the side of the rail opposite from the clamping blocks 42 and 44 and has a lower bifurcated end 64 which engages the web of the rail on the side opposite from the adjustable screws 50. This clamp bar has a first opening at 66 at its upper end to loosely fit onto a threaded rod 68 extending forwardly from the clamp base plate 32 and with a pair of abutment nuts 70 limiting the movement of the clamp bar 62 on the threaded rod 68. A second opening 72 in the clamp bar receives loosely a threaded rod 74 extending outwardly from the clamp base plate 32. A ratchet lever 76 threaded onto the threaded rod 74 acts against a washer 78 fitted against the outer surface of the clamp bar 62. The tightening of the ratchet lever 76 causes the upper end of the clamp bar 62 to abut against one of the abutment nuts and draw the lower bifurcated end 64 of the clamp bar against the web of the rail, with the forces reacting against the spaced-apart clamping blocks 42 and 44 on each of the lower depending parts 80 and 82 of the base plate 32 so that the clamping blocks 42 and 44 are also drawn into a fishing surface (web contour) as defined by the contiguous portions of the head, web, and base on the non-wear surface of the rail 34. The clamp base plate has a cut-out 84 between its depending parts which is sufficient to permit the drill 86 to pass therethough to the web of the rail to be drilled. The clamping blocks 42 and 44 with the pre-set screws conform to the fishing surface of a particular rail, and are readily exchangeable so that the vertical hole center distance from the base to the head on the web 38 of the rail may be accurately aligned for a particular size rail.

With the clamping structure as described herein, and before clamping to a rail, the desired set of clamping blocks for the particular rail size is attached to the base plate 32 by the cap screws 58 and dowel pins 60. The clamping structure is then positioned on the rail. When the rail drill is in the desired longitudinal position, the ratchet lever 76 on the threaded rod 74 is advanced to tighten the clamping structure 30. This draws the clamp bar 62 into tight engagement with the rail and with the forces reacting through the adjustable screws 46, 48, 50 and 52 on the clamping blocks 42 and 44 so that the clamping blocks become wedged in the fishing portion of the rail to lock the rail drill in position whereby a drill bit shown at 86 in FIG. 2 is accurately and properly positioned to drill through the web of the rail. The drill bit 86 and base plate 32 with cut-out 84 and clamp bar 62 being carried by the same common mounting always maintain their same relative vertical and horizontal positions with respect to each other, as shown in FIG. 2 so that there can be no interference between the drill bit 86 and the clamp bar 62. The clamp bar 62 with its lower bifurcated end 64, forms a pair of rail web engaging fingers to provide clearance for the rail drill bit 86 as it passes through the web 38 of the rail 34, as seen in FIG. 1.

A separately notched index means in conjunction with a spring-loaded detent 88 carried by a lateral appendage 90 on the base plate 32 facilitates rapid and accurate use of the rail drill in drilling a plurality of holes in adjacent rail sections that have a predetermined horizontal center-to-center distance from each other. This means includes, as shown in FIGS. 1–3, a template 92 in the form of a bar extending along the top of the rail head 40. A pair of clamping devices, one of which is shown at 94 in FIG. 1, are positioned at opposite ends of the template to fasten the same to the rail head. The positioning of the template 92 on the rail is similar to that shown in U.S. Pat. No. 3,706,505, previously referred to, and reference may be made thereto for a more complete description of the alignment of the template on the rail.

I claim:

1. A clamping apparatus for supporting a rail drill having a base positioned to one side of a rail for support of the rail drill, clamp structure associated with said base for engagement with non-wear surfaces at opposite sides of the rail including a pair of similarly-shaped clamping blocks carried by said base at one side of the rail with each having means providing plural point contact with the rail including contact with the rail base, the rail web and a non-wearing surface of the rail head to accurately locate the base and rail drill relative to the rail, a clamping bar positioned at the opposite side of the rail from said clamping blocks, and means for drawing said clamping bar and clamping blocks toward each other to tightly clamp the rail therebetween with the rail drill accurately located relative to the rail.

2. A clamping apparatus as defined in claim 1 wherein said means on each clamping block providing point contact includes four projecting elements positioned to engage four points on the surface of a rail of a particular size.

3. A clamping apparatus as defined in claim 2 wherein said projecting elements are adjustable screws which may be set and permanently locked in place for a particular size rail.

4. A clamping apparatus as defined in claim 2 wherein said clamping blocks are removably secured to said base for replacement with other clamping blocks for a different size rail.

5. A clamping apparatus as defined in claim 1 wherein said means on each clamping block providing plural point contact includes a plurality of adjustable screws extending outwardly from the clamping block.

6. A clamping apparatus for supporting a rail drill having a base extendable upwardly along one side of the rail, said base having supports for mounting the rail drill thereto and a pair of depending parts with a cut-out therebetween of at least a sufficient diameter for allowing the drill bit of said drill to freely pass therethrough to the rail web, a pair of clamping blocks mounted on said depending parts adjacent the fishing surface of the rail as defined by the contiguous non-wear surfaces of the base, web, and head portions of the rail, each of said blocks being of a dimension for fitting adjacent said fishing surface, a plurality of spaced apart contact elements mounted on said blocks for engaging the non-wear fishing surface of the rail to provide accurate alignment of the base to the rail, a clamp bar adjustably fastened to the base and engageable with the side of the rail web opposite from said clamping blocks, and manually operable means to draw the contact elements and clamping bar into engagement with the rail web on the opposite sides of said rail for accurately aligning the vertical height of the drill bit of said unit with respect to said web, irrespective of rail wear and for locking the drill unit into place on the rail.

7. A clamping apparatus for supporting a machining device relative to a railroad rail, comprising:

a base extending upwardly along one side of the rail, said base including supports for mounting the machining device thereto;

a pair of clamping blocks mounted on said base and spaced-apart lengthwise of a rail to permit a machining element to pass freely therethrough to a point adjacent the web of a rail and with said clamping blocks being positionable adjacent contiguous non-wear surfaces of the base, web, and head of a rail;

a plurality of elements mounted on each of said clamping blocks whereby positioning of said blocks adjacent the rail causes said elements to provide plural point contact with the aforementioned non-wear surfaces of the rail with at least two points of contact being with opposed inclined surfaces of the rail base and the rail head;

and a clamping bar adjustably fastened to the base and engageable with a side of the rail web opposite from said clamping blocks for drawing the clamping blocks and clamping bar toward each other with said two points of contact for each clamping block wedging into engagement with said rail inclined surfaces for accurately aligning the vertical height of the machining device relative to the rail.

* * * * *